March 7, 1967 W. C. WURST 3,307,695
FIELD FRUIT GRADER

Filed Feb. 4, 1965 3 Sheets-Sheet 1

March 7, 1967

W. C. WURST 3,307,695

FIELD FRUIT GRADER

Filed Feb. 4, 1965

3 Sheets-Sheet 3

3,307,695
FIELD FRUIT GRADER
Wilhelm Carl Wurst, Waikerie, South Australia, Australia
Filed Feb. 4, 1965, Ser. No. 430,373
Claims priority, application Australia, Feb. 19, 1964, 41,122/64
6 Claims. (Cl. 209—105)

This invention relates to a fruit grader which is suitable for grading fruit such as, for example, peaches, apricots and the like.

When growing peaches, apricots and other soft fruit for the canneries, there is usually a proportion of fruit which is too small to be accepted by the canneries and it is necessary to remove this undersized fruit. This has usually been effected in a special building outside the actual orchard, but this involves additional handling equipment and higher handling costs, and the main object of this invention is to provide a fruit grading device which will be suitable for use in the field. For a fruit grading device to be suitable fo field use, it needs to be compact, light and relatively cheap. For these reasons the usual fruit grader which consists of a pair of spaced belts moving past increasingly larger openings is unsuitable.

In its simplest form this invention may be said to consist of a base, a spindle journalled in bearings on the base, a circular plate on the spindle, the circular plate having its walls sloping downwardly to its periphery, a curved grading guide fixed relative to the base but disposed above and spaced from the circular plate, the grading guide extending part-way around the circular plate, the space between the grading guide and the circular plate constituting a fruit grading space, and a charging chute carried by the base and arranged to discharge fruit on to the circular plate, whereby fruit in being discharged from the charging chute on to the circular plate while rotating is carried around by the circular plate and is graded by the grading space. With this arrangement it then becomes easy to install the grading device directly on a bulk-handling bin, and the damage inflicted on the fruit can be maintained at a minimum.

It will of course be seen that the grading space between the grading guide and the circular plate can be constant or nearly constant, in which case the grader will be effective in simply dividing the fruit into two groups, one of acceptable size and one of undersize. If the grading space progressively increases the grader can be used to separate the fruit into further groups of sizes if this is desired.

Figure 1:
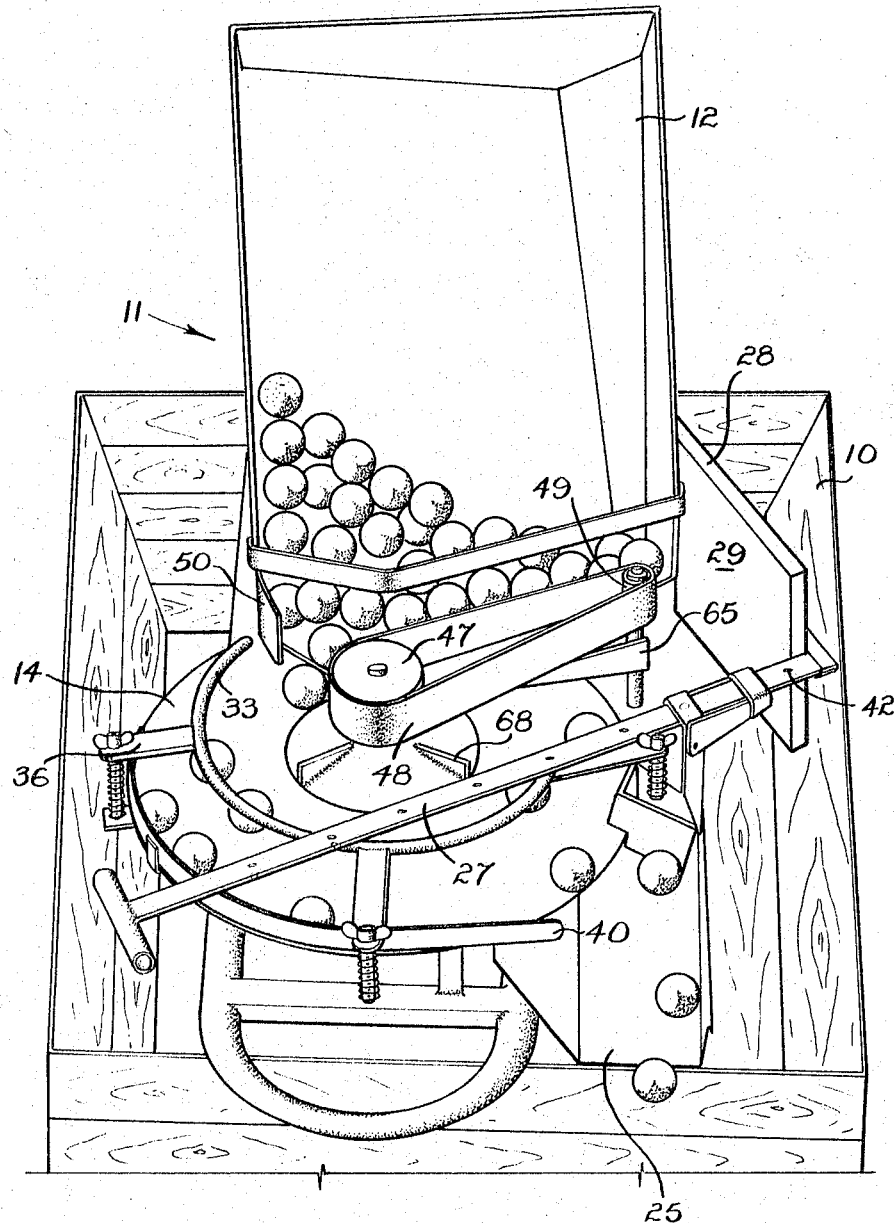
Figure 2:
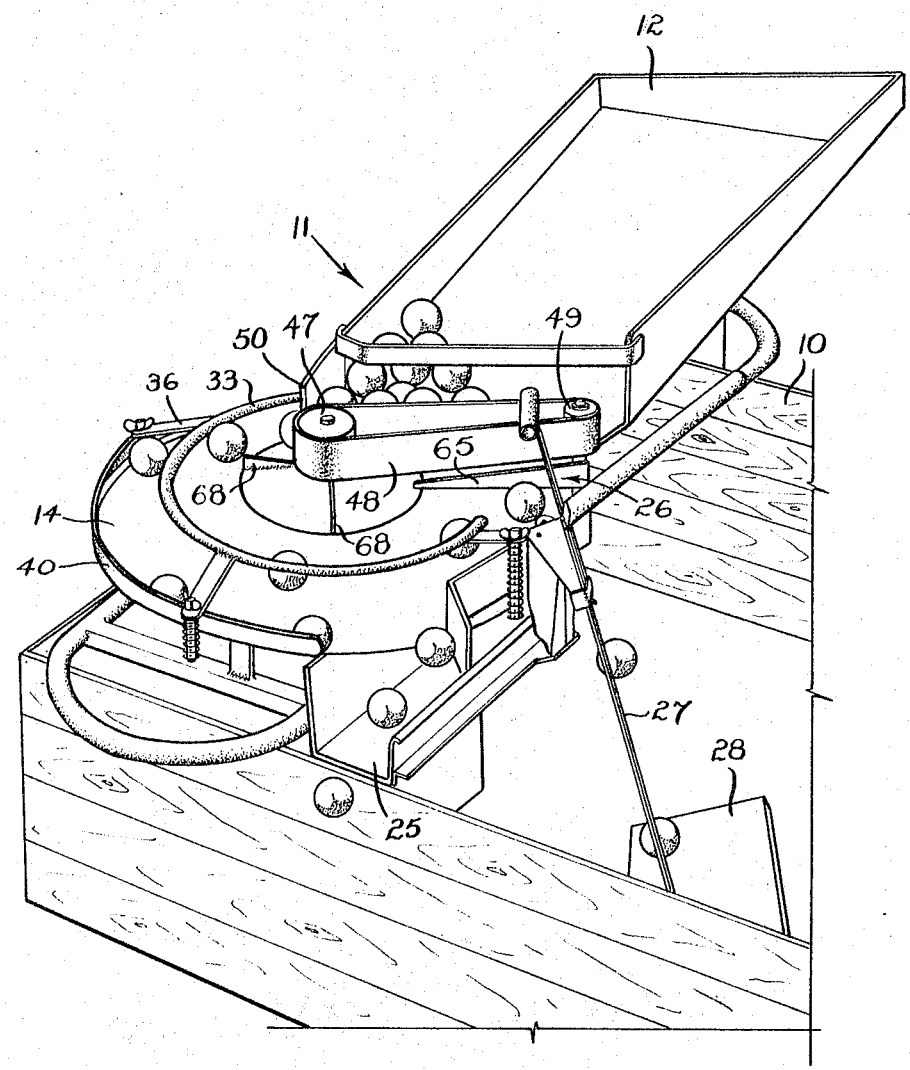
Figure 3:
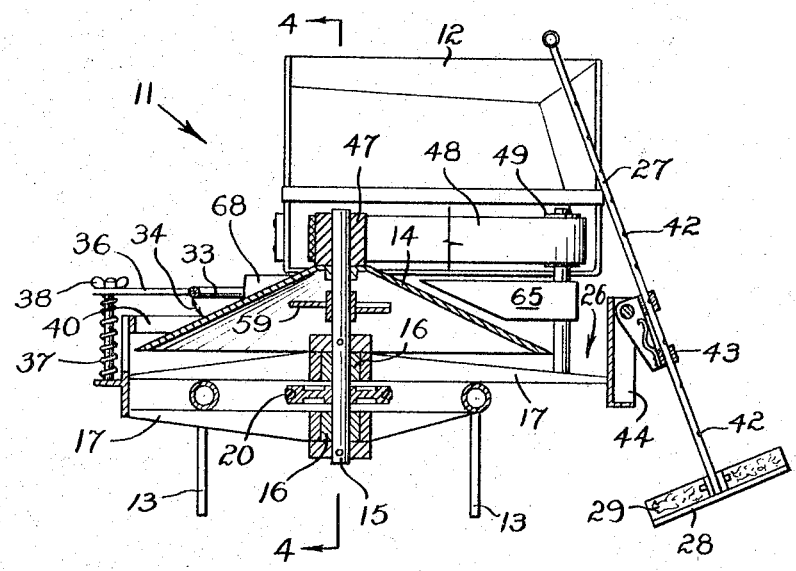
Figure 4:
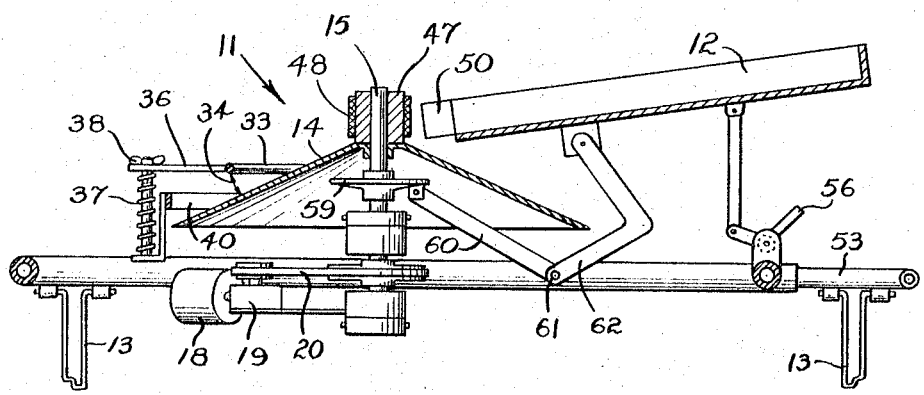

An embodiment of the invention is described hereunder in some detail with reference to and is illustrated in the accompanying drawings, in which:

FIG. 1 is a perspective view of a fruit grader showing an adjustable shock absorbing tray retracted, FIG. 2 is a perspective view of the fruit grader showing the shock absorbing tray in a lowered position, FIG. 3 is a central cross-section through the grader, and FIG. 4 is a central longitudinal section through the grader taken on line 4—4 of FIG. 3.

According to this embodiment, a bulk bin 10 has four sides and a base, and carries on it a grader 11 which is provided with a charging chute 12, the grader 11 being carried on upstanding posts 13 on the sides of the fruit bin 10 and having the chutes 12 sloping downwardly towards a conical plate 14 which has its walls sloping downwardly to its periphery. The conical plate 14 is carried on a shaft 15 journalled in bearings 16 on a base 17, and is driven in this embodiment by means of a small electric motor 18 powered from a storage battery (not shown) through a gearbox 19 and V belt 20.

A reject fruit chute 25 extends outwardly from the conical plate 14 and allows reject fruit to drop on to the ground or into a separate container. At a discharge locality 26, an adjustable arm 27 is pivotally connected to a fixed base 17, the arm 27 having a tray 28 on one end which can be positioned below the discharge point of the acceptable fruit. The tray 28 carries on it a flexible or resilient pad 29 which limits damage to fruit. The discharge locality 26 is adjacent the charging chute 12, but the direction of rotation of the conical plate 14 is such that the fruit traverses more than one hundred and eighty degrees from the charging to the discharging chute.

A grading guide 33 is disposed above the conical plate 14 and extends spirally outwardly, so that the grading guide even when horizontal provides a progressively increasing grading space 34 between its lower edge and the conical plate 14, and this assists in the prevention of jamming of fruit between the conical plate and the grading guide. Any fruit which is too small to be accepted passes beneath the grading guide and rolls out on the reject fruit chute, while the acceptable fruit is carried around by the conical plate and is discharged on to the flexible discharge chute. The grading guide 33 however is carried on arms 36 which are adjustable for height against springs 37 by means of the wing nuts 38. This gives a means for adjusting the grading space 34.

So as to prevent discharge of the undersized fruit around a large portion of the periphery of the conical plate 14, a rail 40 extends part-way around the periphery and terminates at the reject fruit chute 25.

Referring now in more detail to the adjustment arrangement of the tray 28, the arm 27 has notches 42 therein and is arranged as shown in FIG. 3 to be slidable in a carrier 43, the notches engaging a complementary projection in the carrier 43 thereby constituting adjustment means, while the carrier 43 itself is pivoted and can be pivotally positioned relative to the post 44 on the base 17.

In order to facilitate and control the movement of fruit from the chute 12 on to the conical plate 14, the shaft 15 carries a pulley 47 and this in turn drives a flat belt 48 when the conical plate 14 is rotated, the flat belt 48 also being carried on an idler pulley 49. This is set across the mouth of the chute 12 and progressively feeds fruit from the chute 12 on to the conical plate 14. A flexible flap 50 extends outwardly from a side wall of the chute 12 and this normally retains fruit within the chute 12 to be discharged one piece at a time, but its flexibility prevents excessive damage to the fruit in the event of it jamming as the fruit moves from the chute 12 on to the conical plate 14.

The base 17 has a telescopic portion 53 so that the frame can be arranged to fit bins of varying sizes. The legs 13 in being on a telescopic frame enable the base 17 to be positioned above the bin thereby enabling the bin 10 to be completely filled.

A handle 56 is pivoted relative to the base 17 and is arranged to tilt the chute 12 by varying amounts thereby regulating the rate of flow of fruit from the chute 12 on to the plate 14.

A cam plate 59 is carried on the shaft 15 and rocks an arm 60 about a cross member 61, and this rocking motion is imparted to the lower end of the chute 12 by means of a link 62.

A further guide rail 65 is attached to the post carrying the idler pulley 49 and prevents acceptable fruit being carried past the discharge point and jamming under the belt 48.

The raised blades 68 on the conical plate 14 extend part-way out towards the periphery and assist in drawing fruit from the charging chute 12 on to the plate 14.

The above embodiment shows the base 17 and telescopic portion 53 to be straight, but in some cases an improved efficiency can be attained if the base 17 is formed upwardly to the shape of an inverted "V" so that the shaft 15 is inclined at about five degrees to the vertical.

What I claim is:

1. A fruit grader comprising:
   a base,
   a spindle journalled in bearings on the base,
   a circular plate on the spindle, the circular plate having its walls sloping downwardly to its periphery,
   a curved grading guide fixed relative to the base but disposed above and spaced from the circular plate, the grading guide extending part-way around the circular plate, the space between the grading guide and the circular plate constituting a fruit grading space,
   a charging chute pivotally carried by the base and arranged to discharge fruit on to the circular plate, and
   cam means carried by the spindle and coupled to the charging chute, the cam means being arranged to rock the charging chute about a horizontal axis upon rotation of the spindle,
   whereby fruit in being discharged on to the circular plate while rotating is carried around by the circular plate and is graded by the grading space.

2. A fruit grader comprising:
   a base,
   an idler pulley journalled in bearings on the base,
   a spindle journalled in bearings on the base,
   a driving pulley on the spindle,
   a circular plate on the spindle, the circular plate having its walls sloping downwardly to its periphery,
   a curved grading guide fixed relative to the base but disposed above and spaced from the circular plate, the grading guide extending part-way around the circular plate, the space between the grading guide and the circular plate constituting a fruit grading space,
   a charging chute carried by the base and arranged to discharge fruit on to the circular plate, and
   a flexible belt carried by said pulleys and extending across the mouth of the charging chute,
   whereby fruit in being discharged on to the circular plate while rotating is carried around by the circular plate and is graded by the grading space.

3. A fruit grader comprising:
   a base,
   bearings carried by the base,
   a vertically disposed spindle journalled in the bearings, the spindle carrying on its upper end a driving pulley,
   a circular plate having its walls sloping downwardly to its periphery also being carried on the spindle but beneath the pulley thereon,
   a curved grading guide adjustably fixed relative to the base but disposed above and spaced from the circular plate, the grading guide extending part-way around the circular plate, the space between the grading guide and the circular plate constituting a fruit grading space,
   a charging chute pivoted to the base and extending outwardly to one side from the circular plate,
   a handle pivoted to the base and linked to the charging chute constituting slope control means therefor, and
   an idler pulley journalled relative to the main frame and a flat belt extending between the idler pulley and said driving pulley, the belt being disposed across the mouth of said charging chute.

4. A fruit grader comprising:
   a base,
   bearings carried by the base,
   a vertically disposed spindle journalled in the bearings, the spindle carrying on its upper end a driving pulley,
   a conical plate having its walls sloping downwardly to its periphery also being carried on the spindle but beneath the pulley thereon,
   a curved grading guide adjustably fixed relative to the base but disposed above and spaced from the conical plate, the grading guide extending part-way around the conical plate, the space between the grading guide and the conical plate constituting a fruit grading space,
   a rail spaced outwardly radially from the grading guide and extending part-way around the circular plate,
   a reject fruit discharge chute extending outwardly from the periphery of the conical plate and positioned at one end of the rail,
   a charging chute pivoted to the base and extending outwardly to one side from the conical plate, a handle pivoted to the base and linked to the charging chute constituting slope control means therefor, and
   an idler pulley journalled relative to the main frame and a flat belt extending between the idler pulley and said driving pulley, the belt being disposed across the mouth of said charging chute.

5. A fruit grader comprising:
   a base,
   bearings carried by the base,
   a vertically disposed spindle journalled in the bearings,
   a conical plate having its walls sloping downwardly to its periphery also being carried on the spindle but beneath the pulley thereon,
   a curved grading guide adjustably fixed relative to the base but disposed above and spaced from the conical plate, the grading guide extending part-way around the conical plate, the space between the grading guide and the conical plate constituting a fruit grading space,
   a rail spaced outwardly radially from the grading guide and extending part-way around the circular plate,
   a reject fruit discharge chute extending outwardly from the periphery of the conical plate and positioned at one end of the rail,
   a charging chute pivoted to the base and extending outwardly to one side from the conical plate,
   a handle pivoted to the base and linked to the charging chute constituting slope control means therefor,
   a cam plate carried on said shaft beneath said conical disc, and
   an arm pivoted to the base and arranged to be moved by the cam plate upon rotation thereof, and link means between the arm and the charging chute, whereby the charging chute is rocked about a horizontal axis upon rotation of said shaft.

6. A fruit grader comprising:
   a base consisting of two telescopic portions each having legs depending therefrom,
   a pair of aligned bearings carried by the base,
   a vertically disposed spindle journalled in the bearings, the spindle carrying on its upper end a driving pulley,
   a conical plate having its walls sloping downwardly to its periphery also being carried on the spindle but beneath the pulley thereon,
   a curved grading guide adjustably fixed relative to the base but disposed above and spaced from the conical plate, the grading guide extending part-way around the conical plate, the space between the grading guide and the conical plate constituting a fruit grading space,
   a rail spaced outwardly radially from the grading guide and extending part-way around the circular plate,
   a reject fruit discharge chute extending outwardly from the periphery of the conical plate and positioned at one end of the rail,
   a charging chute pivoted to the base and extending outwardly to one side from the conical plate,
   a handle pivoted to the base and linked to the charging chute constituting slope control means therefor,
   a cam plate carried on said shaft beneath said conical disc,
   an arm pivoted to the base and arranged to be moved by the cam plate upon rotation thereof, and link means between the arm and the charging chute, whereby the charging chute is rocked about a horizontal axis upon rotation of said shaft, an idler pulley journalled relative to the main frame and a flat belt extending between the idler pulley and said driving pulley, the belt being disposed across the mouth of said charging chute, a flexible flap extending outwardly from a side wall of said charging chute, and power drive means connected for drive to said shaft.

References Cited by the Examiner

UNITED STATES PATENTS

| | | | |
|---|---|---|---|
| 1,336,059 | 4/1920 | Winchester | 209—87 X |
| 1,460,270 | 6/1923 | Purchas | 209—87 |
| 2,582,007 | 1/1952 | Christiansen | 209—90 X |
| 2,941,651 | 6/1960 | Hutter | 198—30 |

M. HENSON WOOD, Jr., *Primary Examiner.*

R. A. SCHACHER, *Assistant Examiner.*